United States Patent [19]

Story

[11] 3,708,671
[45] Jan. 2, 1973

[54] SYSTEM FOR INDICATING DIRECTION OF INTRUDER AIRCRAFT

[75] Inventor: Anne W. Story, Cambridge, Mass.

[73] Assignee: The United States of America as represented by the National Aeronautics & Space Administration

[22] Filed: March 16, 1971

[21] Appl. No.: 124,909

Related U.S. Application Data

[63] Continuation of Ser. No. 808,822, March 20, 1969, abandoned.

[52] U.S. Cl. ..............250/209, 250/215, 250/217, 315/153, 340/25, 340/27 R
[51] Int. Cl. ......G08g 5/00, H05b 37/02, H05b 39/04
[58] Field of Search.....340/27 NA, 25, 258 D, 33, 27 R;
356/4; 250/209, 220, 217, 215; 315/153

[56] References Cited

UNITED STATES PATENTS

| 3,203,305 | 8/1965 | Fairbanks | 340/27 R |
| 2,338,536 | 1/1944 | Plaut-Carcasson | 340/27 NA |
| 3,191,147 | 6/1965 | Majendie | 340/27 R |

Primary Examiner—James W. Lawrence
Assistant Examiner—T. N. Grigsby
Attorney—John R. Manning, Herbert E. Farmer and Garland T. McCoy

[57] ABSTRACT

A pilot warning indicator system is disclosed including a flashing beacon, a detector, and an indicating panel on each aircraft. The detector responds to radiant energy from another aircraft's beacon by energizing particular signal lamps positioned in the periphery of the pilot's normal field of view. Since the positions of the energized lamps are related to the direction from which radiant energy is received by the detector, the pilot is apprised of the relative position of an intruder aircraft without any shift in visual fixation.

3 Claims, 5 Drawing Figures

PATENTED JAN 2 1973 3,708,671

INVENTOR:
ANNE W. STORY,
BY *J. H. McCoy*
*John R. Manning*
ATTORNEYS

INVENTOR:
ANNE W. STORY,
BY
John R. Manning
ATTORNEYS

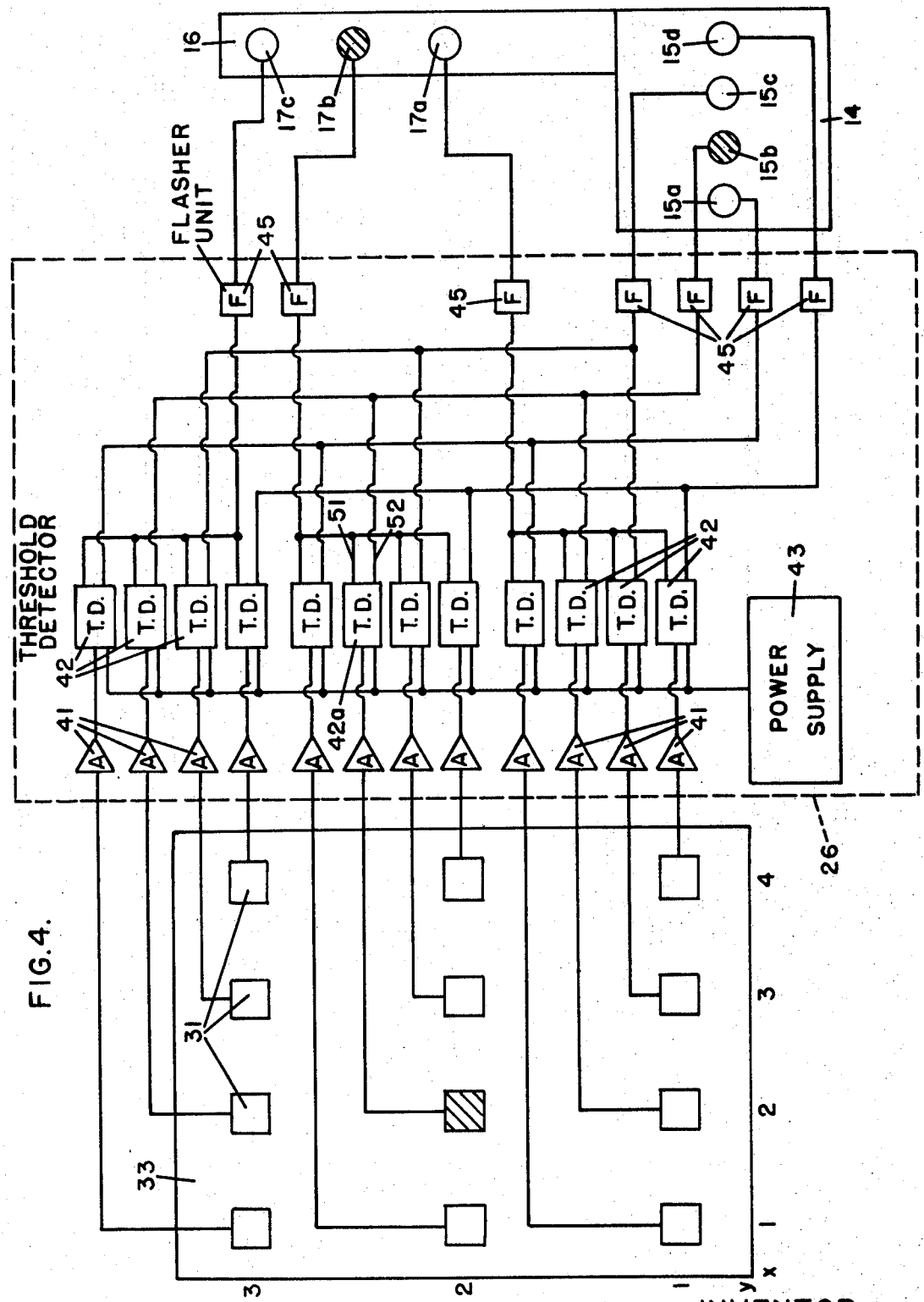

3,708,671

SYSTEM FOR INDICATING DIRECTION OF INTRUDER AIRCRAFT

This application is a continuation of Ser. No. 808,822 filed Mar. 20, 1969, now abandoned.

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates generally to a position indicating system and, more particularly, relates to a system for warning pilots that aircraft or other obstacles are located in their field of flight.

Most aircraft collisions occur in the vicinity of airports under conditions of good visibility. In attempts to reduce the occurrence of such accidents various types of pilot warning indicator (PWI) systems have been utilized or suggested. Most prior PWI systems entailed instruments located among other flight instruments on the cockpit panel of the aircraft. Visual observation of the instruments required the pilot to shift his visual fixation back and forth from inside to outside the aircraft. Numerous disadvantages result from the required visual shifts including the existence of significant time lags and the non-detection of warning signals when the pilot's fixation is elsewhere at the time an instrument must be read.

The object of this invention, therefore, is to provide an indicating system that alerts a pilot of aircraft or other obstacles in his field of flight without requiring him to alter visual fixation.

SUMMARY OF THE INVENTION

The invention is characterized by the provision of an aircraft with a radiant energy signalling device, a radiant energy detector adapted to produce a plurality of discrete output signals each indicative of a given level of radiation received from a different direction, a plurality of distinguishable indicators mounted for visual observation by the pilot and each representing one of the different directions indicated by the output signals, and a control circuit connected to receive the output signals and adapted to energize an indicator representing a given direction in response to reception of an output signal indicative thereof. The detector responds to the radiant energy emitted by signalling devices on other aircraft and the control circuit energizes particularly positioned indicators to alert the pilot as to the relative position of such aircraft.

One feature of the invention is the provision of an indicating system of the above type wherein the output signals are indicative of radiation received from directions in two dimensions and the indicators comprise lamps mounted in a two-dimensional display in the periphery of the pilot's normal field of observation. According to this arrangement the pilot receives a two-dimensional indication of an intruding aircraft's relative position without any requirement for a shift from the visual fixation normally maintained during landing operations.

Another feature of the invention is the provision of an indicating system of the above type wherein each of the output signals is indicative of a given position in a Cartesian coordinate system, the indicating lamps are arranged in vertical and horizontal columns, and the control circuit energizes a particular lamp in each of the vertical and horizontal columns in response to the reception of one output signal. By appropriate coordination of output signals and lamp positions, the intersection of imaginary vertical and horizontal lines passing through an energized set of lamps indicates the relative position in which an intruder aircraft has been detected.

Another feature of the invention is the provision of an indicating system of the above types wherein the lamps are arranged in a plurality of vertical columns that include horizontally aligned rows of lamps and in a plurality of horizontal columns that include vertically aligned rows of lamps, and the control circuit sequentially energizes particular rows of lamps in each of the horizontal and vertical columns. The use of sequentially energized rows of vertically and horizontally aligned lamps enhances the pilot's ability to discern the position of an obstacle indicated by the intersection of imaginary lines passing through the energized rows of lamps.

Another feature of the invention is the provision of an indicating system of the above types wherein the signalling device is an intermittently energized xenon lamp and the detector includes an array of silicon detectors. Because of the excellent match between the silicon detector's sensitivity curve and the energy content distribution of a properly parameterized xenon lamp, these elements form a uniquely suited combination for use in the invention.

BRIEF DESCRIPTION OF THE DRAWINGS

These and other features and objects of the present invention will become apparent upon a perusal of the following specification taken in conjunction with the accompanying drawings wherein:

FIG. 4 is a circuit diagram showing circuit connections between the detector, control circuit and indicating lamps shown in FIG. 2.

DESCRIPTION OF THE PREFERRED EMBODIMENTS

Figure 1:
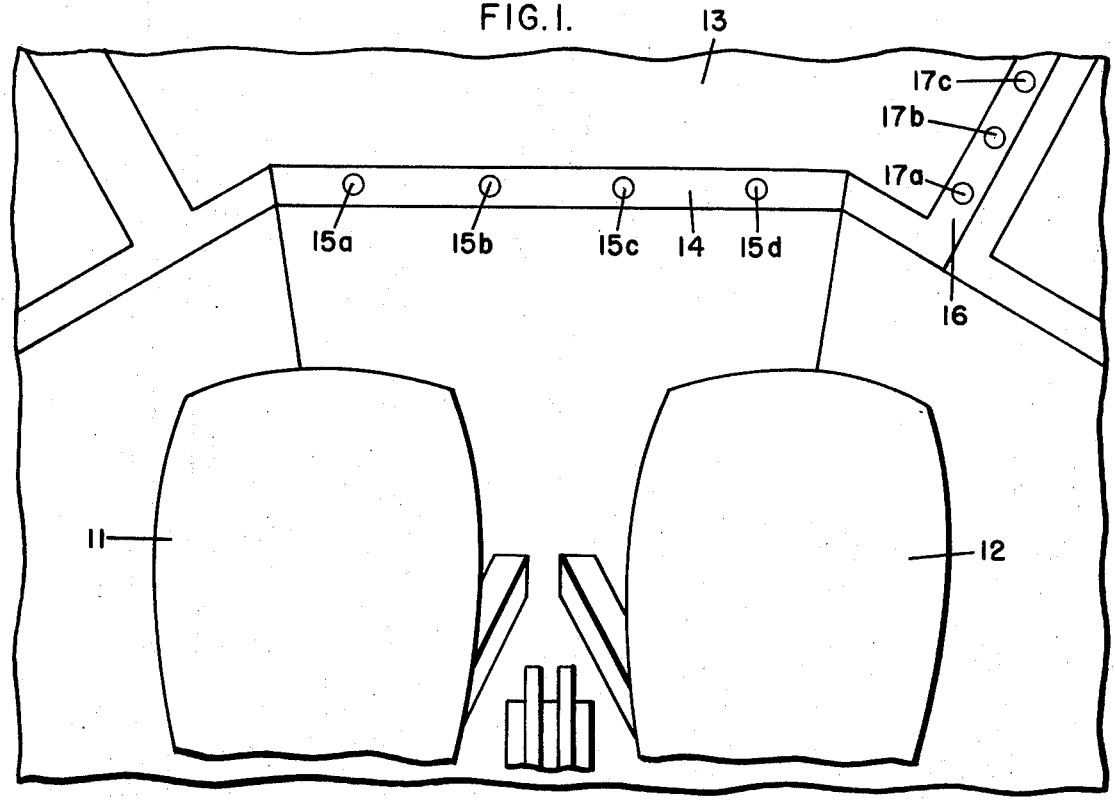
FIG. 1 is a schematic illustration of an aircraft cockpit equipped with lamp indicators according to the invention.

Referring now to FIG. 1 there is shown a partial view of an airplane cockpit including the pilot's and co-pilot's seats 11 and 12 disposed in front of the windshield 13 that defines the pilot's normal field of view. Directly adjacent the bottom edge of the windshield 13 is a panel 14 retaining a horizontally disposed column of lamps 15a, 15b, 15c and 15d. Similarly disposed adjacent the right edge of the windshield 13 is a panel 16 retaining the vertically disposed column of lamps 17a, 17b and 17c. The lamps 15 and 17 are positioned so as to lie in the peripheral field of vision defined by the windshield 13. According to the invention predetermined particular combinations of the lamps 15 and 17 are lighted so as to visually indicate to the pilot the relative positions in his field of view at which a collision obstacle has been detected. The manner in which both the detection and lamp display are accomplished will be described in greater detail below.

Figure 2:
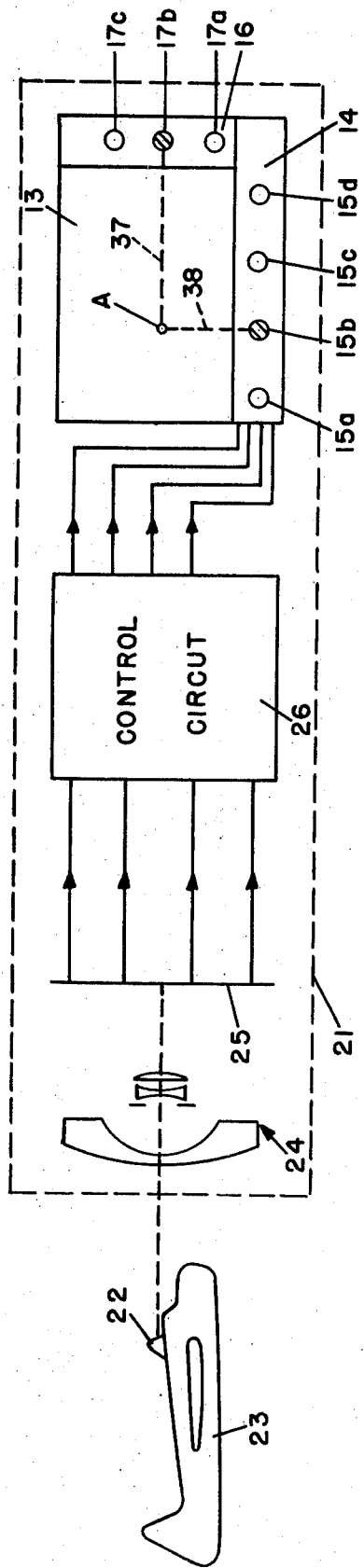
FIG. 2 is a schematic block diagram of a complete indicating system embodiment of the invention.

FIG. 2 illustrates in schematic block form a preferred indicating system 21 embodiment of the invention shown receiving radiant energy from the flashing beacon 22 mounted on another aircraft 23. According to the overall concept intended by the invention, all aircraft will be equipped with an indicating system 21 and at least one compatible flashing beacon 22. Preferably each aircraft would be equipped with a plurality of beacons so as to prevent the existence of blind spots with respect to the indicating systems of other aircraft. As shown, the radiant energy from the beacon 22 is directed by the optical assembly 24 to the radiant energy detector 25. Responsive to the reception of detectable energy levels, the detector 25 transmits discrete output signals to the control circuit 26. As described below, each output signal produced by the detector 25 is indicative of the particular direction from which the detected radiant energy was received. Responsive to the signals received from the detector 25 the control circuit 26 energizes particular lamps 15 and 17 (shown also in FIG. 1) that indicate to the pilot the relative position of the energy source detected.

Figure 3:
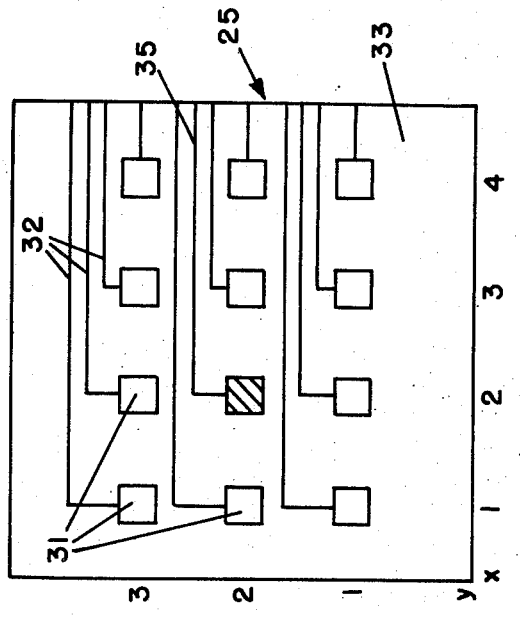
FIG. 3 is a schematic illustration of a detector array suitable for use in the embodiment shown in FIG. 2.

During operation of the indicating system 21, the optical assembly 24 images the radiation source in a corresponding mirrored position on the plane formed by the detector 25. The lens assembly illustrated is a Hills sky lens that exhibits a desirable 180° to 200° field of view. This lens assembly is described in Compilation of Data From Related Technologies in the Development of an Optical Pilot Warning Indication System-NASA Technical Note in process (ERC C-48). FIG. 3 illustrates in plan view the detector 25 that receives radiant energy from the optical assembly 24. As shown, the detector 25 comprises a plurality of individual detector elements 31 and output leads 32 mounted on the substrate 33. The individual detector elements 31 are arranged in an array such as to be identifiable by their Cartesian coordinate x and y positions. Each of the individual detectors 31 produces a discrete output signal on its associated output line 32 in response to reception of radiant energy from the optical assembly 24. As noted above, these signals are utilized by the control circuit 26 to energize particular lamp sets in the panels 14 and 16 adjacent the pilot's windshield 13.

To additionally explain operation of the indicating system 21, let us assume that the beacon 22 of the aircraft 23 is located within the pilot's field of view but is not yet visible. Assume further that point A on the windshield 13 of FIG. 2 represents the vertical and horizontal and horizontal position of the beacon. The radiant energy transmitted by the intruder plane's beacon 22 will be directed by the optical assembly 24 to a particular detector element 31 related to the position of the plane. In our example, the received radiant energy is directed by the optical assembly 24 to the shaded $x=2$, $y=2$ detector element 31 that produces an output signal on output line 35. Obviously, this output signal is indicative of detected radiant energy received from a given direction within the field of view encompassed by the optical assembly 24. The control circuit 26 responds to the output signal on signal line 35 by energizing shaded lamps 15b and 17b. As shown, the dotted horizontal line 37 to shaded lamp 17b and the dotted vertical line 38 to shaded lamp 15b intersect at point A which was the assumed position of the intruder aircraft. Thus, the pilot of the detecting aircraft can gauge the relative position of the intruder aircraft by visually estimating the point of intersection between the imaginary lines 37 and 38 established by the energized lamps 15b and 17b. Furthermore, because of the lamps peripheral location, this exercise can be accomplished by the pilot without any change in fixation from the field of view defined by the windshield 13.

According to a preferred embodiment, the invention would use Xe-lamps for the flashing beacons 22 and the silicon detectors for the detector elements 31. A properly parameterized Xe-lamp will develop a preponderance of its spectral energy in the visible (4,000–7,000 A) and the near IR (7,000–11,000 A) while the sensitivity curve of a silicon detector is roughly in the range between 6,500–10,500 A. Thus, the upper output range of the Xe-lamp is excellently matched to the detection sensitivity of the silicon detector while the lower output range of the Xe-lamp provides a visible warning to approaching aircraft.

Referring now to FIG. 4 there is shown in detail the control circuit 26 connected between the detector 25 and the indicator panels 14 and 16. Each output lead 32 from each detector element 31 on the substrate 33 is connected to a pre-amplifier 41 which is in turn connected to a threshold detector 42. Also connected to all of the threshold detectors 42 is the power supply 43. Each threshold detector 42 provides an output on two separate leads, one of which is connected to the horizontal column of lamps 15 and the other to the vertical column 17. Connected between the threshold detectors 42 and the lamps 15 and 17 are the flasher units 45 of, for example, the type used for automobile turn signals.

In response to the reception of a predetermined radiant energy level each of the detector elements 31 generates an output signal that after amplification in a pre-amplifier 41 exceeds the threshold level of the associated threshold detector 42. Energizing output signals are then produced on both output lines of that particular threshold detector 42. The circuit connections in the control circuit 26 are such that an output signal from any of the detector elements 31 in the $y=1$ column of the detector array produces energization of vertical lamp 17a, an output signal from any detector element 31 in the $y=2$ column produces energization of the vertical lamp 17b, and an output signal from any detector element 31 in the $y=3$ column produces energization of the vertical lamp 17c. Similarly, an output signal from any detector element 31 in the $x=1$ column produces energization of horizontal lamp 15a, an output signal from any detector elements 31 in the $x=2$ column produces energization of horizontal lamp 15b, an output signal from any detector element 31 in the $x=3$ column produces energization of horizontal lamp 15c, and an output signal from any detector element 31 in the x=4 column produces energization of the horizontal lamp 15d. Thus, a correlation exists between the positions of an energized pair of lamps 15 and 17 and the coordinate position of the energizing detector element 31 which is in turn related to the particular direction from which the activating radiation is received. For example, in the specific case assumed above, an output signal from the detector element 31 (shown shaded in FIG. 4) in the x=2, y=2 position of the detector array 25 results in activation of the threshold detector 42a. The resultant output signal on line 51 energizes vertical lamp 17b and the output signal on line 52 energizes horizontal lamp 15b as illustrated in both FIGS. 2 and 4.

Figure 5:
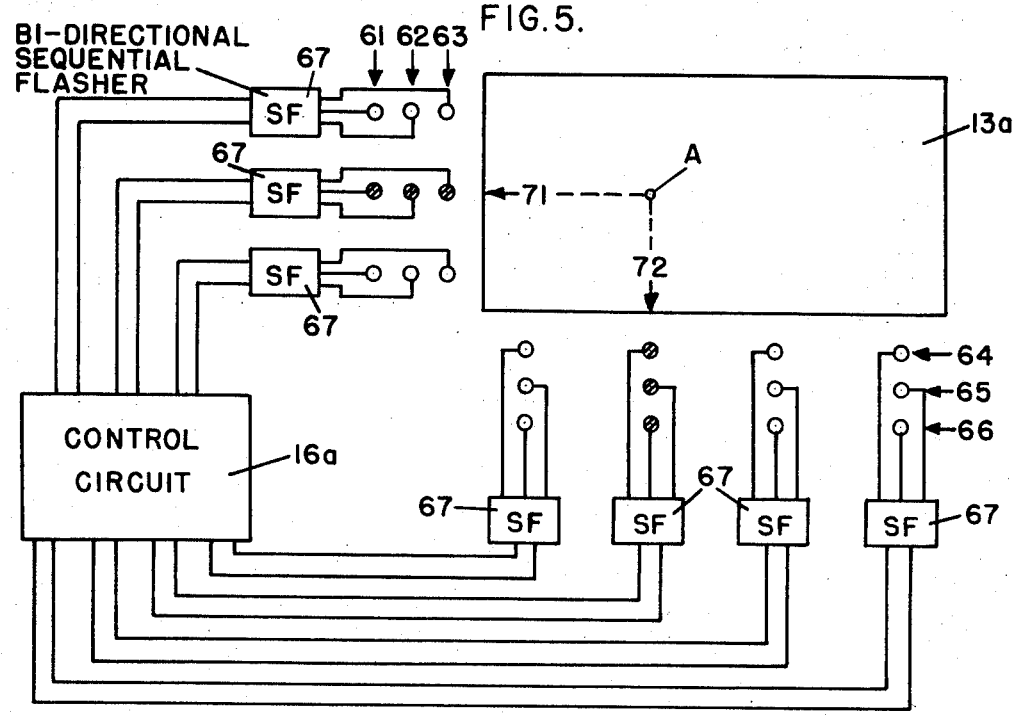
FIG. 5 is a schematic block circuit diagram of another indicator panel embodiment of the invention.

FIG. 5 shows another embodiment of the invention in which three vertical columns of lamps 61–63 and three horizontal columns of lamps 64–66 are disposed adjacent, respectively, a side and bottom edges of the pilot's windshield 13a. The various lamps 61–66 are energized by the control circuit 16a similar to that described above through the bi-directional sequential flashers 67 of, for example, the type also used for automobile signalling devices.

The embodiment of FIG. 5 operates in the same manner as that explained above in connection with FIG. 2 except that the individual flashing lamps are replaced with sequentially energized rows of lamps. Thus, responsive to a radiation source at the position used in the above example, the shaded lamps in horizontal row 71 of the vertical lamp columns and vertical row 72 in the horizontal lamp columns would be sequentially energized to indicate the presence of an obstacle at relative position A. The advantage of this embodiment is that sequentially flashing rows of lamps aid the pilot in establishing the imaginary horizontal and vertical lines of sight that establish the intersection point A.

The FIG. 5 embodiment also can indicate the presence of obstacles not in the pilot's field of view e.g., slightly behind the detecting aircraft. The actual direction of the detected obstacle is indicated by the particular flashing sequence produced. For example, a forward obstacle is indicated by an outside (rows 61 and 66), middle (rows 62 and 65), inside (rows 63 and 64) lamp energization sequence while a rearward obstacle is indicated by an inside-middle-outside lamp sequence. Thus, as shown, each bi-directional flasher 67 is connected by two leads to the control circuit 16a. A signal on one of the leads produces one lamp energization sequence while a signal on the other lead produces the opposite sequence.

Thus, the present invention produces a PWI system that warns a pilot of obstacles without the requirement for shift in visual fixations. Because the signals provided by lamps 15 and 17 are peripheral, they picked up via different visual channel than foveal signals and therefore may be more readily detected than would indications displayed on a conventional instrument panel device. Furthermore, after initial detection, the disclosed system promotes rapid visual acquisition of an intruder via the visible output range of the Xe signalling beacons. Consequently, a pilot can select maneuvers from a two-dimensional escape trajectory manifold rather than being restricted to only Up-Down maneuvers postulated in many existing range and range-rate collision avoidance systems.

Obviously many modifications and variations of the invention are possible in light of the above teachings. For example only, the particular arrangements and numbers of indicating lamps illustrated were chosen for reasons of simplicity and understanding. Many other lamp arrangement could be desirable in given applications. Also, the signalling beacons 22 could be mounted on fixed obstacles (towers, buildings, runways) as well as on the aircraft themselves. Similarly, types of signalling lamps, optical assemblies, detectors and control circuits other than those specifically disclosed could be utilized within the bounds of the invention as claimed.

I claim:

1. An indicating system for warning a pilot of an aircraft of the presence of an intruder aircraft in the area comprising a radiant energy detector means mounted on an aircraft for receiving radiant energy signals from intruder aircraft and for producing, responsive thereto, discrete output signals indicative of the direction of an intruder aircraft from the aircraft, a horizontal row of spaced apart lamps and a vertical column of spaced apart lamps forming a Cartesian coordinate system, each said row and column of lamps being mounted in the periphery of the field of view observed by an average pilot of the aircraft when facing forward and looking through the windshield of the aircraft in normal flying position so that said lamps may be observed without a shift in visual fixation from the normal flight path and that signals from the lamps are picked up by a visual channel different from that for foveal signals, and control means for receiving said discrete output signals and for maintaining in an energized condition, a lamp in said row and in said column so that the position of an intruder aircraft is indicated as having an $x$ and $y$ position in real space corresponding to the coordinates defined by the energized lamps in said Cartesian coordinate system.

2. The indicating system of claim 1 including means for intermittently flashing the energized lamps.

3. An indicating system for warning a pilot of an aircraft of the presence of an intruder aircraft in the area comprising a radiant energy detector means mounted on an aircraft for receiving radiant energy signals from intruder aircraft and for producing, responsive thereto, discrete output signals indicative of the direction of an intruder aircraft from the aircraft, a plurality of horizontal rows of spaced apart lamps and a plurality of vertical columns of spaced apart lamps, each of said rows being mounted side by side and each of said columns of lamps being mounted side by side and the side by side lamps of the rows and columns forming a Cartesian coordinate system, said rows and said columns being located in the periphery of the field of view observed by an average pilot of the aircraft when facing forward and looking through the windshield of the aircraft in normal flying position so that said lamps may be observed without a shift in visual fixation from the normal flight path and that signals from the lamps are picked up by a visual channel different from that for foveal signals, control means for receiving said discrete output signals and for maintaining in an energized condition, corresponding lamps in said rows and in said columns so that the position of an intruder aircraft is indicated as having an $x$ and $y$ position in real space corresponding to the coordinates defined by the energized lamps in said Cartesian coordinate system, and means for sequentially flashing the adjacent energized lamps in said rows and in said columns so that the coordinate position of an intruder aircraft is suggested by the intersection of the two lines formed by the energized lamps.

\* \* \* \* \*